US010917922B2

(12) United States Patent
Proschowsky

(10) Patent No.: US 10,917,922 B2
(45) Date of Patent: Feb. 9, 2021

(54) AUDIO COMMUNICATION SYSTEM WITH A DONGLE

(71) Applicant: GN Audio A/S, Ballerup (DK)

(72) Inventor: Morten Proschowsky, Ballerup (DK)

(73) Assignee: GN Audio A/S, Ballerup (DK)

( * ) Notice: Subject to any disclaimer, the term of this patent is extended or adjusted under 35 U.S.C. 154(b) by 0 days.

(21) Appl. No.: 16/704,634

(22) Filed: Dec. 5, 2019

(65) Prior Publication Data

US 2020/0205206 A1 Jun. 25, 2020

(30) Foreign Application Priority Data

Dec. 20, 2018 (EP) .................................... 18214744

(51) Int. Cl.

*H04W 76/10* (2018.01)
*H04W 4/80* (2018.01)
*G06F 13/42* (2006.01)
*H04R 3/00* (2006.01)
*H02J 7/00* (2006.01)

(52) U.S. Cl.

CPC ........ *H04W 76/10* (2018.02); *G06F 13/4282* (2013.01); *H04R 3/00* (2013.01); *H04W 4/80* (2018.02); *G06F 2213/0042* (2013.01); *H02J 7/0045* (2013.01); *H04R 2420/07* (2013.01); *H04R 2420/09* (2013.01)

(58) Field of Classification Search

CPC ..... H04W 76/10; H04W 4/80; G06F 13/4282; H04R 3/00

See application file for complete search history.

(56) References Cited

U.S. PATENT DOCUMENTS

| | | | |
|---|---|---|---|
| 9,860,680 | B2 | 1/2018 | Tian et al. |
| 9,980,083 | B2 | 5/2018 | Rotsaert |

(Continued)

FOREIGN PATENT DOCUMENTS

| | | |
|---|---|---|
| CN | 102421040 | 4/2012 |
| CN | 103715577 | 4/2014 |

(Continued)

OTHER PUBLICATIONS

Extended European Search Report for European patent application No. 18214744.7 dated Jun. 27, 2019.

*Primary Examiner* — Md K Talukder
(74) *Attorney, Agent, or Firm* — Hamre, Schumann, Mueller & Larson, P.C.

(57) ABSTRACT

An audio communication system is disclosed. The audio communication system comprises a speaker device having at least one speaker, a first wireless communication unit and a first connector part; a dongle having control functionality, a second wireless communication unit, and a second connector part, the dangle being configured to operate in a first mode being an audio communication system pairing mode and in a second mode being an audio communication system operating mode. The second connector part is in the audio communication system pairing mode configured to interconnect with the first connector part to enable pairing of the dongle and the speaker device. The second connector part is the audio communication system operating mode configured to interconnect with an external device, providing wireless communication between the speaker device and the external device.

15 Claims, 7 Drawing Sheets

(56) References Cited

U.S. PATENT DOCUMENTS

| | | | | |
|---|---|---|---|---|
| 10,034,079 | B2 * | 7/2018 | Wilker | H04R 1/026 |
| 2005/0286466 | A1 | 12/2005 | Tagg et al. | |
| 2008/0063216 | A1 * | 3/2008 | Sakata | H04L 7/041<br>381/80 |
| 2008/0233978 | A1 * | 9/2008 | Batey | H04M 1/05<br>455/41.2 |
| 2011/0214168 | A1 | 9/2011 | Wyld | |
| 2015/0212967 | A1 * | 7/2015 | Griffin | H04W 4/80<br>710/304 |
| 2015/0282216 | A1 | 10/2015 | Reshef et al. | |
| 2016/0014545 | A1 | 1/2016 | Tian et al. | |
| 2016/0070444 | A1 * | 3/2016 | Valimaki | H04L 65/00<br>715/716 |
| 2017/0099568 | A1 | 4/2017 | Rotsaert | |
| 2017/0164413 | A1 | 6/2017 | Bernsen et al. | |
| 2017/0180990 | A1 * | 6/2017 | Pedersen | H04W 12/0401 |
| 2017/0202040 | A1 * | 7/2017 | Chatterton | G06Q 20/4012 |
| 2018/0255398 | A1 * | 9/2018 | Fischer | H04R 3/12 |
| 2019/0236777 | A1 * | 8/2019 | Takada | G06T 11/60 |
| 2019/0289395 | A1 * | 9/2019 | Fischer | G06F 3/162 |

FOREIGN PATENT DOCUMENTS

| | | |
|---|---|---|
| EP | 3185509 | 6/2017 |
| WO | 2010136043 | 12/2010 |

* cited by examiner

AUDIO COMMUNICATION SYSTEM WITH A DONGLE

The present disclosure relates generally to audio communication systems, such as to an audio communication system comprising a dangle, and particularly to an audio communication system comprising a dongle, and wherein the dongle enables communication with external devices.

BACKGROUND

Audio communication systems are known which allow a user to use e.g. a headset or a speakerphone with host devices, including computers, video game consoles, etc. Typically, for wireless headsets, a dongle is provided with the headset to provide for example a Bluetooth connection between the headset and a computer.

Even when most host devices, such as computers, do include integrated wireless transceiver devices which are operating according to wireless communication standards, such as the Bluetooth or DECT wireless communication standards, it is preferred to a have a separate transceiver device dedicated for wireless communication with the headset. This is due to the integrated wireless transceiver devices of e.g. computers may be allocated to other uses simultaneously and therefore not allocate sufficient bandwidth for voice communication or not be able to ensure sufficiently high bitrate for audio streaming. Still further, such integrated transceiver devices may not be compatible with proprietary communication protocols and thereby may not allow additional functions to be controlled from the headset such as call answer, call end, mute, next track, pause, play, etc. However, such controls can be made available by using a dongle as intermediate element, setting up the wireless connection to the headset and connecting to the computer, so as to establish a wireless communication between the host device and the headset.

Such wireless dongles are typically pre-paired with the headset, so that a connection between the headset and the dongle can be made without first pairing the dongle and the headset. Should a user want to exchange either headset or dongle, a pairing process needs to be initiated. However, such a new pairing process is often complex. The new pairing process typically require use of dedicated software to be installed on the host device, such as a manufacturer specific app, such as a manufacturer specific software for creating a manufacturer specific user interface, etc., and is generally more time consuming than what most users expect and accept for a pairing process.

SUMMARY

It is an object of the present invention to provide an audio communication system which is configured to allow for easier pairing between a speaker device and a dongle of the audio communication system.

In accordance with the present disclosure, the above-mentioned and other objects are obtained by the disclosed audio communication system. The audio communication system comprises a speaker device and a dongle. The speaker device has at least one speaker, a first wireless communication unit and a first connector part. The dongle has a second wireless communication unit and a second connector part. The dongle may have control functionality, such as call control functionality. The dongle is configured to operate in a first mode being an audio communication system pairing mode. The dongle is configured to operate in a second mode being an audio communication system operating mode. The first mode and the second mode may be different modes. The dongle may at any one time operate in either the first mode or the second mode. In the audio communication system pairing mode, the second connector part is configured to interconnect with the first connector part to enable pairing of the dongle and the speaker device. In the audio communication system operating mode, the second connector part is configured to interconnect with an external device, providing wireless communication between the speaker device and the external device.

In accordance with the present disclosure, the above-mentioned and other objects are obtained by the disclosed method of operating an audio communication system.

The audio communication system comprises a speaker device having at least one speaker, a first wireless communication unit and a first connector part; and a dongle having a second wireless communication unit and a second connector part. The dongle may have control functionality, such as call control functionality. The method comprises in a first mode being an audio communication system pairing mode:

connecting the second connector part with the first connector part, and enabling pairing of the dongle and the speaker device;

in a second mode being an audio communication system operating mode:

connecting the second connector part with an external device, and providing wireless communication between the speaker device and the external device.

In some embodiments the audio communication system is configured for one-way communication. In some embodiments, the audio communication system is configured for two-way communications.

The speaker device comprises at least one speaker. The speaker device may be a speaker, such as a loudspeaker. The speaker device may be a headset, such as a mono headset, such as a stereo headset. In some embodiments, the speaker device further comprises one or more microphones. The speaker device may be a headset with a microphone, such as a headset with a microphone boom. The speaker device may be a speaker with a microphone, such as a speakerphone, etc.

The audio communication system has a first wireless communication unit and a second wireless communication unit. The first and second wireless communication units are configured for wireless communication, and the first and second wireless communication units are in this respect interconnected with antennas, such as first and second antennas, for emission and reception of an electromagnetic field. The wireless communication unit may comprise a transmitter, a receiver, a transmitter-receiver pair, such as a transceiver, a radio unit, etc. The wireless communication unit may be configured for communication using any protocol as known for a person skilled in the art, including Bluetooth, including Bluetooth Low Energy, Bluetooth Smart, etc., DECT standards, WLAN standards, manufacture specific protocols, such as tailored proximity antenna protocols, such as proprietary protocols, such as low-power wireless communication protocols, such as CSR mesh, etc. In some embodiments, the first and the second wireless communication units are Bluetooth communication units, using any of the Bluetooth standards known for pairing and communication.

In some embodiments, the dangle has control functionality, such as built-in control functionality. The control functionality may provide remote control functionalities. The control functionality may comprise muting, volume control, such as volume up, volume down, next track, pause, play etc. The control functionality may furthermore comprise call control functionality including answering calls, rejecting calls (hook-on, hook-off), etc.

In some embodiments, the control functionality, such as the call control functionality, is implemented as a human interface device protocol, such as a Human-Interface-Device, HID, such as USB-HID. The dongle may use the HID descriptors to communicate speaker device capabilities with the external device.

The control functionality, such as the call control functionality may be controlled via a user interface at the speaker device.

When operating in the first mode being an audio communication system pairing mode, a pairing between the speaker device and the dongle is initiated and processed. The pairing process may ensure that a secure or unique connection is formed between the speaker device and the dongle.

In some embodiments, the speaker device is configured to initiate pairing between the dongle and the speaker device. Thus, the speaker device may act as the master requesting the dongle for pairing information.

In some embodiments, the speaker device is configured to automatically pair the speaker device and the dongle upon connection of the first connector part with the second connector part. In some embodiments, the speaker device is configured to initiate pairing between the dongle and the speaker device upon connection of the first connector part with the second connector part.

In some embodiments, the speaker device comprises a user interface. The user interface may be provided with inputs, including for example buttons or wheels. The user interface may comprise an initiating button enabling a user to initiate pairing between the speaker device and the dongle when the first connector part and the second connector part are interconnected. Typically, the pairing process is automatically completed upon initiation.

It is an advantage of pairing the speaker device with the dongle when the first connector part and the second connector part are interconnected, such as upon interconnection of the first connector part and the second connector part as no software application on an external device is needed to pair or renew a pairing between the speaker device and the dangle. Typically, when either a dongle is needed for a further speaker device, or if a new dangle should be used with an existing speaker device, a complex pairing process often using proprietary software applications has been required.

In the second mode being an audio communication system operating mode, the first wireless communication unit in the speaker device is configured to be in communication with the second wireless communication unit in the dangle. In some embodiments, when the dongle is interconnected with the external device, e.g. by interconnecting the second connector part with a third connector part of the external device, the audio communication system is configured to provide wireless communication between the speaker device and the external device. The audio communication system may be configured to provide wireless communication between the speaker device and the external device via the dongle.

The external device may be a computer, a laptop, a tablet, a telephone, such a desk phone, a mobile phone, such as a smart phone, etc. It is an advantage of using a dongle, such as a wireless enabled dongle, to establish or provide wireless communication between the speaker device and the external device, as hereby any deficiencies of the external device and particularly, any deficiencies of the wireless capabilities of the external device may be overcome. Particularly when providing high-end speaker devices, the manufacturer would like to retain some control over the wireless communication as otherwise, deficiencies of any external device used with the speaker device may be, wrongly, attributed to the speaker device.

In some embodiments, the dongle comprises a standard connector type interface, such as a Lightning type interface, a USB type interface, such as a USB type interface of any USB type standard, such as a USB type interface according to the USB 2.0 standard, the USB 3.0 standard, the micro-USB standard, the USB-C standard, etc. In some embodiments, the USB type interface is a USB-C type interface.

The speaker device has a first connector part and the dongle has a second connector part. The second connector part in the audio communication system pairing mode is configured to interconnect with the first connector part to enable pairing of the dongle and the speaker device. The second connector part in the audio communication system operating mode is configured to interconnect with an external device, providing wireless communication between the speaker device and the external device.

In some embodiments, a charging cable is configured to charge the speaker device via the first connector part. The charging cable may have a first charging cable connector part in a first end of the charging cable, the first charging cable connector part being configured to interconnect with the first connector part. A second charging cable connector part is configured to interconnect with a power charging source of any kind. In some embodiments, the second charging cable connector part is configured to interconnect with the third connector part, or a further third connector part, of the external device.

In some embodiments, the second connector part is configured to physically, such a mechanically, such as non-wireless, such as directly, connect to the first connector part of the speaker device and configured to physically, such as mechanically, such as non-wireless, such as directly, connect to a third connector part of an external device.

In some embodiments, the first connector part and the second connector part form a pair of mating connectors. The first connector part may be a first receptacle connector part and the second connector part may be a protruding connector part. The receptacle connector part may be configured to receive the protruding connector part. The first connector part and the second connector part may form a female/male connector pair.

In some embodiments, the third connector part may be a second receptacle connector part and the second connector part may be a protruding connector part. The second receptacle connector part may be configured to receive the protruding connector part. The third connector part and the second connector part may form a female/male connector pair.

The first connector part may be provided as an opening in the speaker device. Typically, the at least one speaker, and the first wireless communication unit is provided in a housing, such as in an earphone. The opening may be provided in the housing.

The speaker device may furthermore comprise one or more electrical circuits, e.g. for interconnecting the at least one speaker and the first wireless communication unit, for pairing with the dongle, etc. In some embodiments, the first connector part may comprise first electrical contacts, such as first electrical contacts for establishing contact between the first connector part and the one or more electrical circuits, such as the pairing circuit. In some embodiments, the second connector part may comprise corresponding second electrical contacts, the second electrical contacts being configured to couple with the first electrical contacts upon interconnection of the first connector part and the second connector part.

In some embodiments, the dongle has one connector part, such as only one connector part, the one connector part being the second connector part. The dongle may be a small device which plugs into the external device to provide the functionality of a wireless adapter enabling wireless communication between the external device and the speaker device.

In some embodiments, the audio communication system is configured to provide a notification when the pairing has succeeded. The notification may be provided at the dongle and/or at speaker device. The notification may comprise a visual notification, such as a visual notification comprising LEDs, sound, such as sound from the at least one speaker, etc.

In some embodiments, the speaker device is configured to provide a first notification before being paired; the dongle is configured to provide a second notification before being paired, and wherein the speaker device is configured to provide a third notification and the dongle is configured to provide a fourth notification after pairing has succeeded. The third notification and the fourth notification may having at least one notification parameter in common.

For example, the first notification and the second notification may be visual or audio notifications having different frequencies, such as LEDs blinking at first and second frequencies, respectively, before being paired, the first frequency being different from the second frequency. The third and fourth notifications provided after pairing has succeeded may be visual or audio notifications having the same frequency, such that the third frequency is the same as the fourth frequency. The third and fourth frequency may correspond to the first frequency or the second frequency.

In some embodiments, the first and second notifications comprises first and second colours, the first and second colours being different, while the third and fourth notifications comprises third and fourth colours, the third and fourth colours being the same colour. It is an advantage that the user is notified when the pairing process is completed in that the user may then move the dongle from the speaker device to the external device, to start using the speaker device, and the wireless communication between the speaker device and the external device.

The present invention relates to different aspects including the audio communication system described above and in the following, and corresponding audio communication systems comprising headsets, speakerphones, headsets for voice communication, methods, uses and/or product means, each yielding one or more of the benefits and advantages described in connection with the audio communication system first mentioned, and each having one or more embodiments corresponding to the embodiments described in connection with the first mentioned audio communication system and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
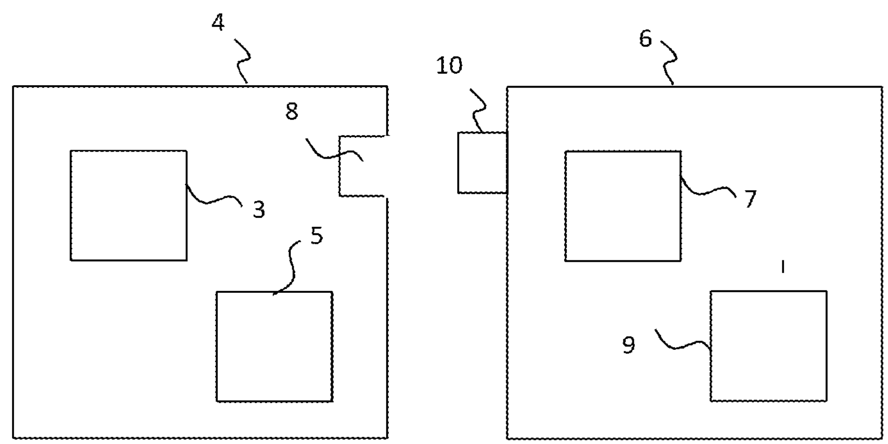
FIG. 1 schematically illustrates an exemplary audio communication system.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 illustrates an exemplary audio communication system 2. The audio communication system 2 comprises a speaker device 4 having at least one speaker 3, a first wireless communication unit 5 and a first connector part 8. The audio communication system 2 further comprises a dongle 6 having control functionality 9, a second wireless communication unit 7, and a second connector part 10. The dongle 6 is configured to operate in a first mode being an audio communication system pairing mode and in a second mode being an audio communication system operating mode. The second connector part 10 in the audio communication system pairing mode is configured to interconnect with the first connector part 8 to enable pairing of the dangle 6 and the speaker device 4, such as a Bluetooth pairing. The second connector part 10 is, in the audio communication system operating mode, configured to interconnect with an external device (not shown in FIG. 1), providing wireless communication between the speaker device 4 and the external device (not shown). The control functionality 9 of the dongle 6 may be implemented as a human-interface-device, HID.

Figure 2:
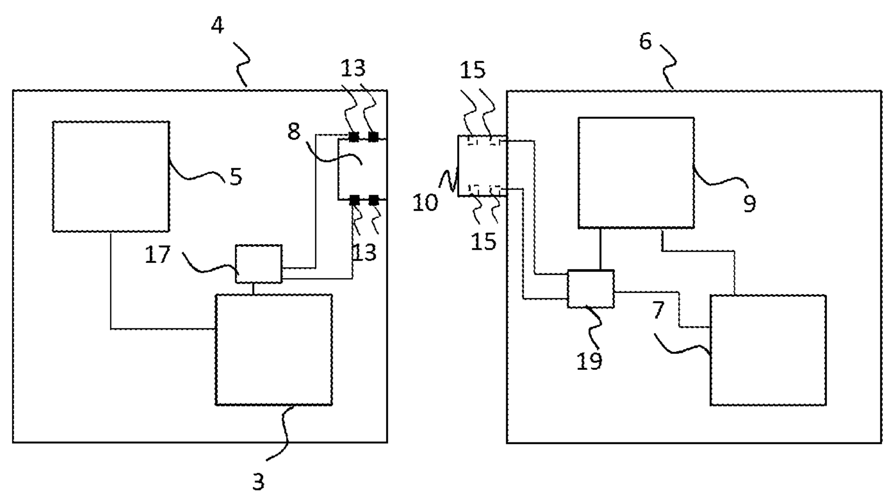
FIG. 2 schematically illustrates another exemplary audio communication system.

FIG. 2 shows an audio communication system 2 in more detail. In the audio communication system 2 in FIG. 2, the speaker device 4 further comprises one or more electrical circuits 17 and the dongle 6 comprises one or more electrical circuits 19. Electrical circuits 17, 19 may comprise processors, e.g., for audio processing, for pairing, etc. First electrical contacts 13 in the first connector part 8 are configured to interconnect with second electrical contacts 15 in the second connector part 10 to establish an electrical interconnection between the first connector part 8 and the second connector part 10. The first electrical contacts 13 interconnects with the one or more electrical circuits 17 which interconnects to the first wireless communication unit 5 and speaker 3.

Second electrical contacts 15 in the second connector part 10 are configured to interconnect with first electrical contacts 13 in the first connector part 8 to establish an electrical interconnection between the first connector part 8 and the second connector part 10. The second electrical contacts 15 interconnects with the one or more electrical circuits 19 which connects to the second wireless communication unit 7, and control functionality 9.

Figure 3A:
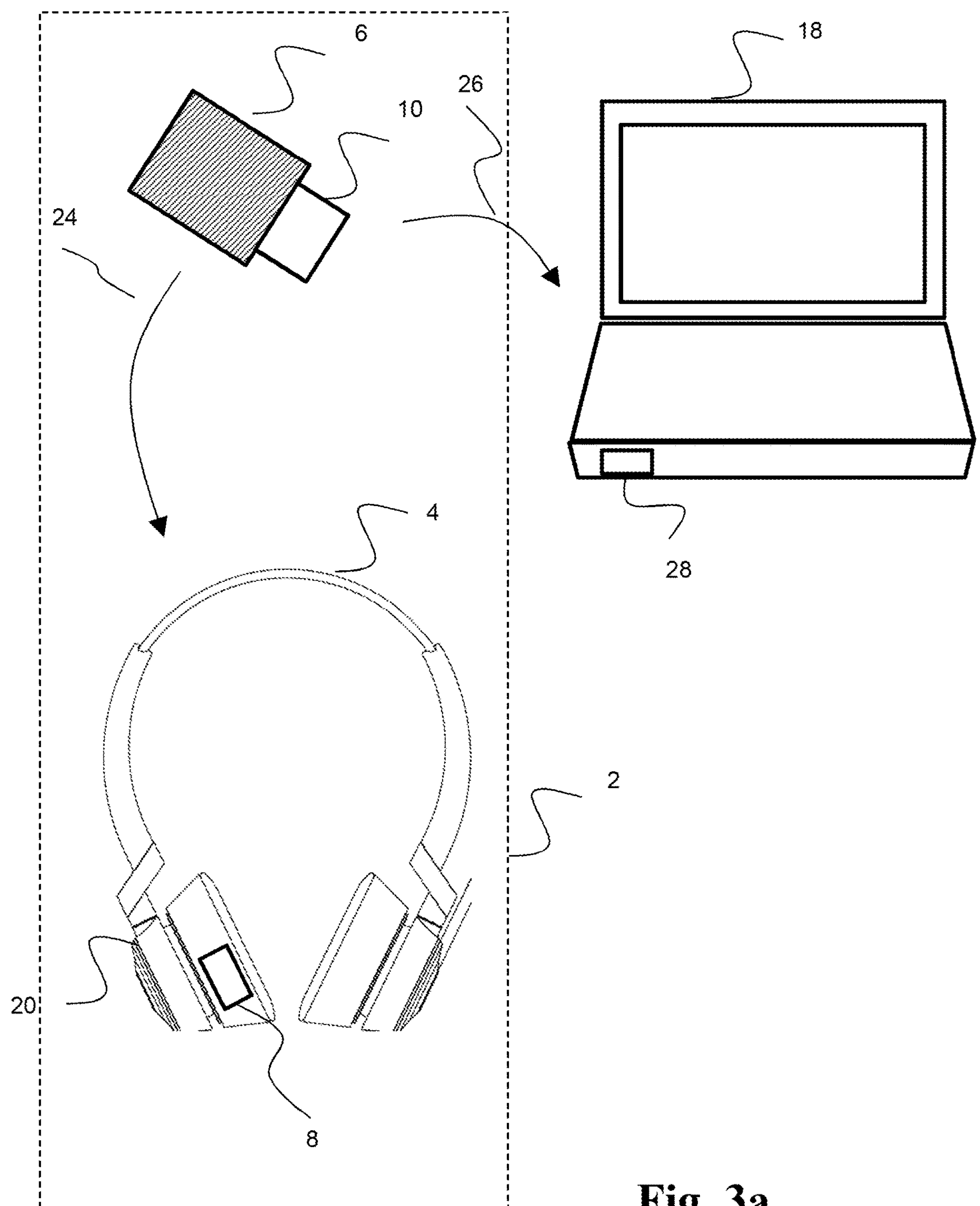
FIGS. 3*a* and 3*b* schematically illustrates the components of the audio communication system.

FIG. 3*a* shows an audio communication system 2 and an external device 18. In FIG. 3*a*, the speaker device 4 is a headset, and a first connector part 8 is provided in the headset, such as in the earphone 20. The dongle 6 has a second connector part 10 protruding dongle 6. It is seen that the first connector part 8 forms an opening for receiving the second connector part 10. The dongle 6 is configured to connect to the headset 4 in a first mode 24 being an audio communication system pairing mode 24, and the dongle 6 is configured to be connected to the external device 18 in the second mode 26 being an audio communication system operating mode 26. The external device 18 has a third connector part 28 configured to receive the second connector part 10 of the dongle 6 in the operating mode.

Figure 3B:
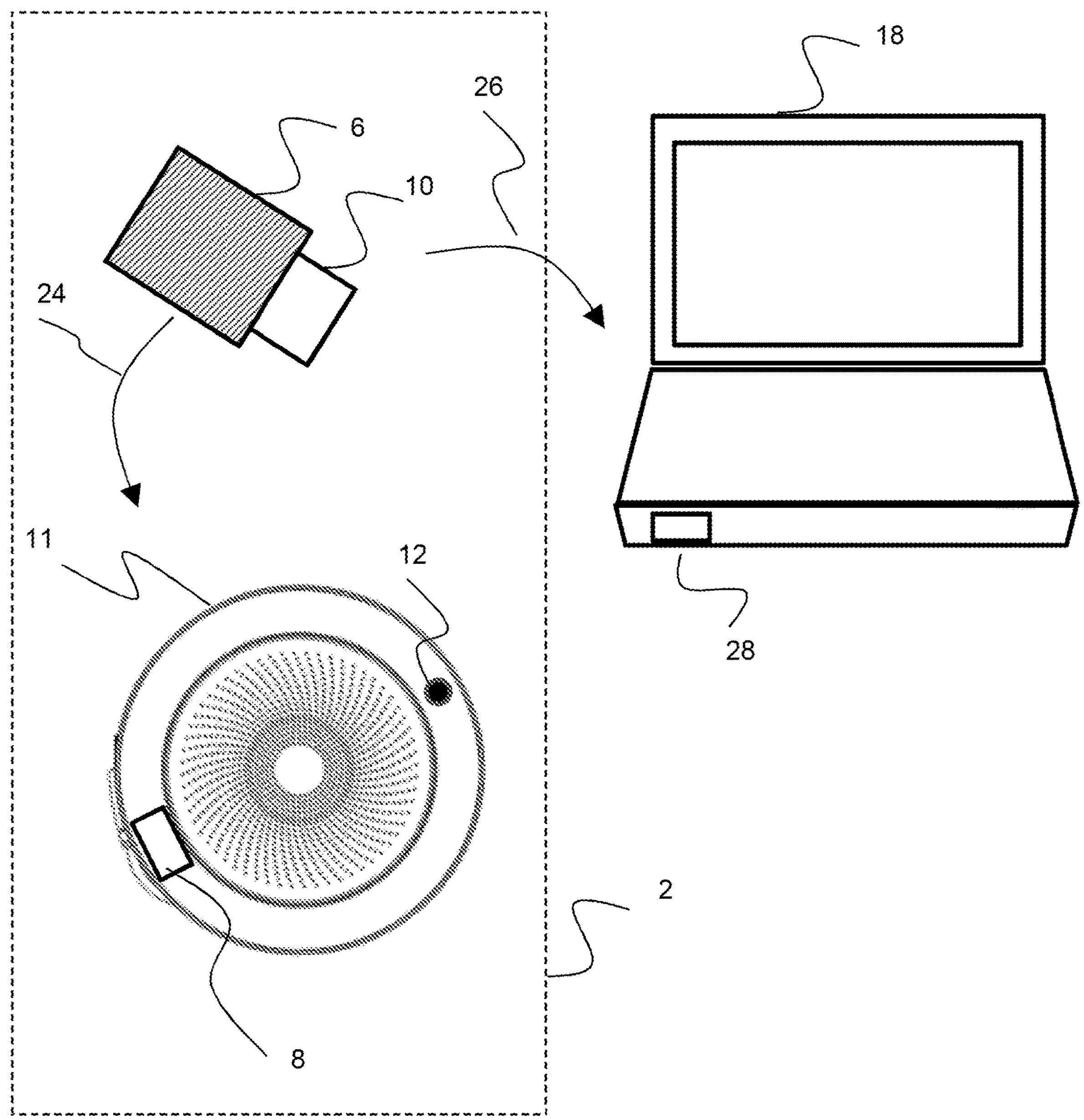

FIG. 3*b* shows an audio communication system 2 and an external device 18. In FIG. 3*b*, the speaker device 4 is a speakerphone 11 having a microphone 12, and a first connector part 8 is provided in the speakerphone. The dongle 6 has a second connector part 10 protruding from dongle 6. It is seen that the first connector part 8 forms an opening for receiving the second connector part 10. The dangle 6 is configured to be connected to the speakerphone 4 in a first mode 24 being an audio communication system pairing mode 24, and the dongle 6 is configured to be connected to the external device 18 in the second mode 26 being an audio communication system operating mode 26. The external device 18 has a third connector part 28 configured to receive the second connector part 10 of the dongle 6 in the operating mode.

It is an advantage of being able to quickly and easily pair a speaker device 4 with an external device 18, such as a laptop 18. For example, a user may be entering a meeting room with his own laptop 18 and his own dongle 6 from e.g. a personal headset, which may be inserted into the third connector part 28 of the laptop 18. A speakerphone 11 is provided in the meeting room, and typically, the user would not be able to use such a speakerphone, unless there was e.g. a wired connection. However, by using an audio communication system according to the present disclosure, the user can insert his own dongle 6 into the speakerphone 11 and thereby enable pairing between the provided speakerphone 11 and his dangle. After pairing, the user can insert the dongle into his laptop and obtain a wireless communication between his laptop 18 and the speakerphone 11 provided in the meeting room via the dangle 6.

Figure 4A:
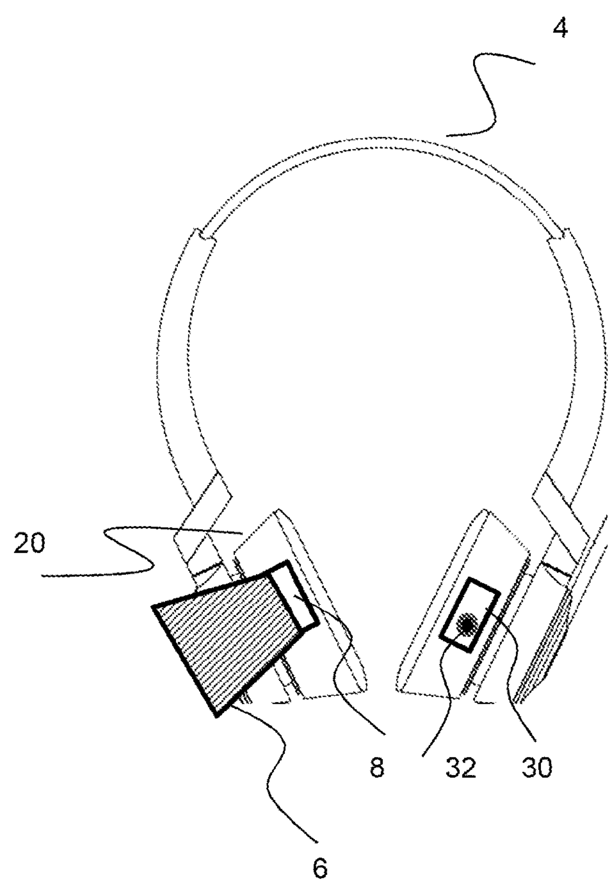
FIGS. 4*a* and 4*b* schematically illustrates the first mode and the second mode, respectively.
Figure 4B:
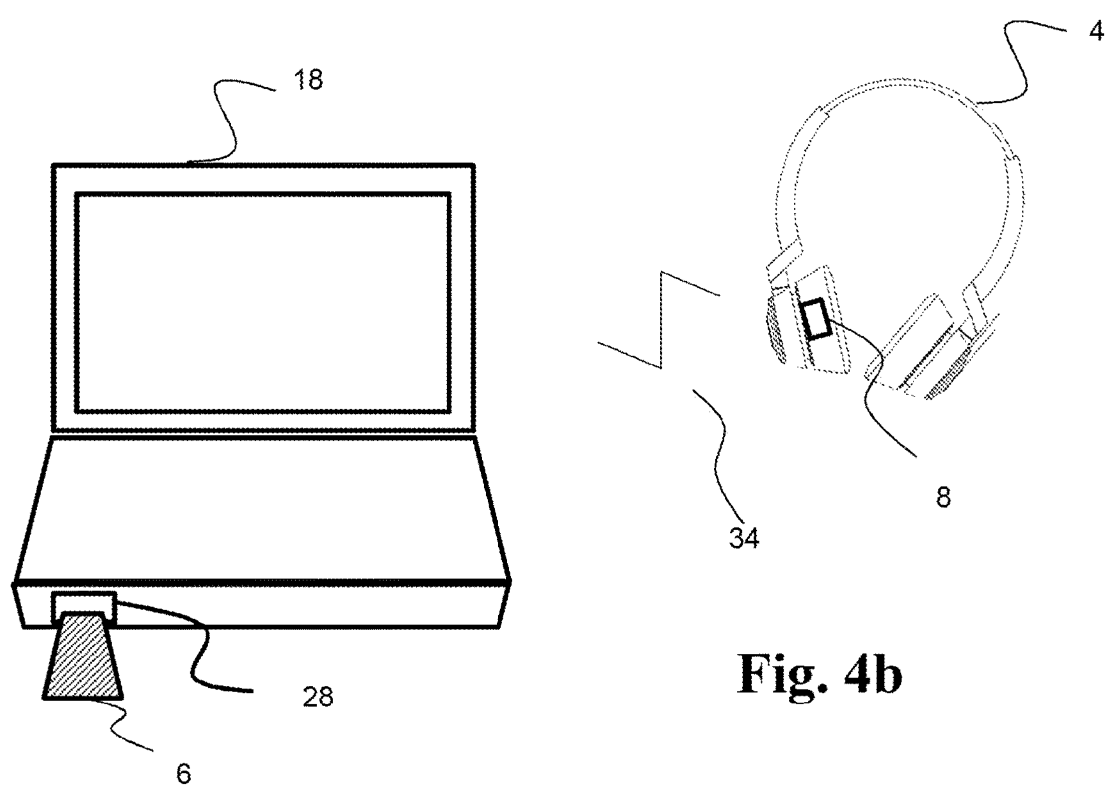

FIGS. 4*a* and 4*b* show different operation modes for the audio communication system 2. In FIG. 4*a*, the dangle is configured to operate in the first mode being the audio communication system pairing mode. The second connector part 10 of the dongle 6 is interconnected with the first connector part 8, thus, the second connector part 10 may be inserted into first connector part 8, to enable pairing of the dongle 6 and the speaker device 4. In FIG. 4*b*, the dongle is configured to operate in the second mode being the audio communication system operating mode. The second connector part 10 of the dongle 6 is interconnected with external device 18, such as inserted in third connector part 28, providing wireless communication between the speaker device 4 and the external device 18 via the dongle 6.

FIG. 4*a* shows the dongle 6 positioned interconnected with the speaker device 4. The second connector part 10 is engaged with the first connector part 8, and there is an electrical interconnection between the dongle 6 and the speaker device 4 and a pairing is initiated from the speaker device 4 upon insertion of the second connector part 10 in the first connector part 8. In some embodiments, the speaker device comprises a user interface 30 comprising at least one button 32. The pairing process may be initiated upon activation of the button 32.

FIG. 4*b* shows the dangle 6 positioned interconnected with external device 18. The second connector part 10 is engaged with the third connector part 28, and there is an electrical interconnection between the dangle 6 and the external device 18. The dongle is configured to provide wireless communication between the speaker device and the external device by establishing a wireless connection between the first wireless communication unit 5 and the second wireless communication unit 7. The wireless connection 34 may be according to any standard, and may be for example a Bluetooth connection, a DECT connection, etc. Thus, wireless communication is provided between the speaker device 4 and the external device 18 via the dongle 6, such as via the second wireless communication unit 7 of the dangle 6.

Figure 5:
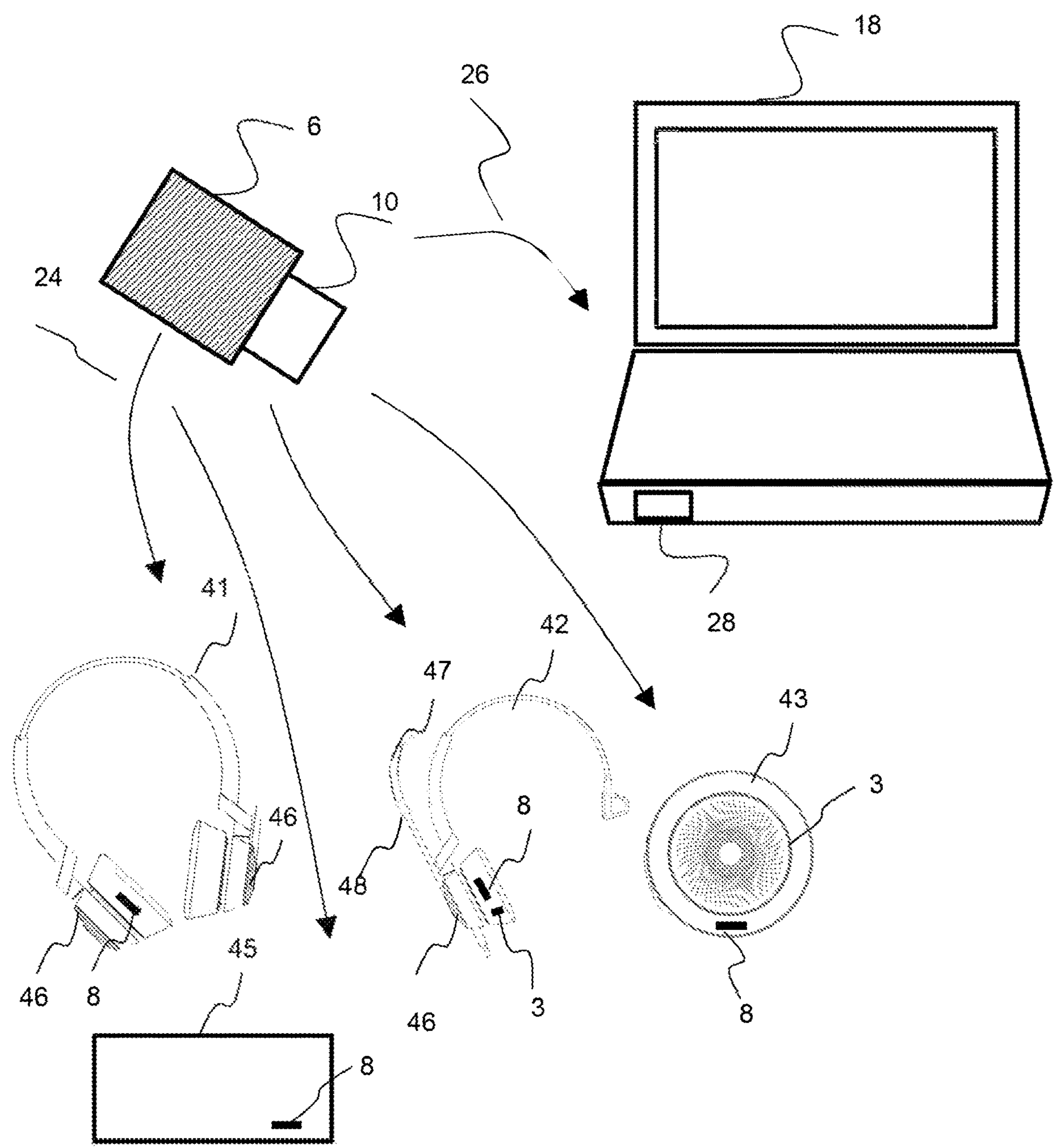
FIG. 5 schematically illustrates the audio communication system with different speaker devices.

FIG. 5 shows different speaker devices according to the present disclosure. In FIG. 5, an audio communication system 2 and an external device 18 is shown. The speaker device 4 of the audio communication system 2 may be a stereo headset 41 having two earphones 46, a speakerphone 43, a headset for voice communication 42, a loudspeaker 45, e.g. for playing music, etc.

The speakerphone 43 is a speaker device comprising at least one speaker 3 and one or more microphones 47. The headset for voice communication 42 comprises a headset having one or two earphones 46, at least one speaker 3 and one or more microphones 47. The headset for voice communication 42 has the one or more microphones provided in a microphone boom 48.

Figure 6:
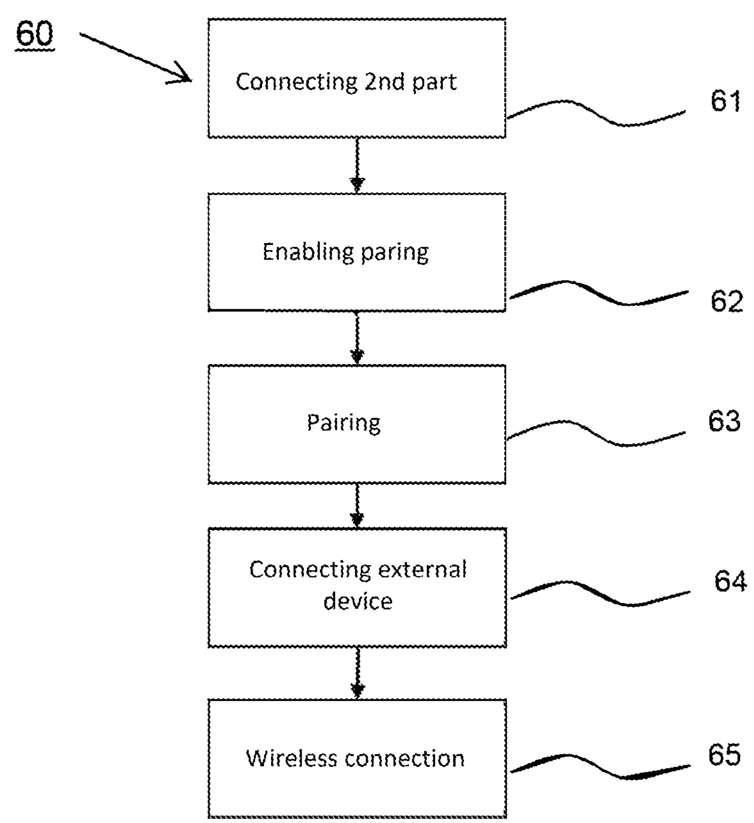
FIG. 6 is a flowchart of the disclosed method.

FIG. 6 is a flowchart of the disclosed method. In an audio communication system comprising a speaker device having at least one speaker, a first wireless communication unit and a first connector part, and a dongle having call control functionality, a second wireless communication unit and a second connector part, the method of operating an audio communication system 60 comprises in step 61 connecting the second connector part with the first connector part, and in step 62 enabling pairing of the dongle and the speaker device; in step 63 performing the pairing process, in step 64 connecting the second connector part with an external device, such as with a third connector part of the external device, and in step 65 providing wireless communication between the speaker device and the external device.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

2 audio communication system
3 speaker
4 speaker device
5 first wireless communication unit
6 dangle
7 second wireless communication unit 8 connector part
9 control functionality
10 second connector part
11 speakerphone
12 microphone
13 first electrical contacts
15 second electrical contacts
17 electrical circuits
19 electrical circuits
18 external device
20 ear phone
24 audio communication system pairing mode
26 audio communication system operating mode
28 third connector part
30 user interface
32 button
34 wireless connection
41 stereo headset
42 headset for voice communication
43 speakerphone
45 loudspeaker
46 earphones
47 microphones
48 microphone boom

The invention claimed is:

1. An audio communication system comprising a speaker device having at least one speaker, a first wireless communication unit and a first connector part, a two part dongle having control functionality, a second wireless communication unit, and a second connector part, the dongle being configured to operate in a first mode being an audio communication system pairing mode and in a second mode being an audio communication system operating mode, wherein the second connector part in the audio communication system pairing mode is configured to physically interconnect with the first connector part to enable pairing of the dongle and the speaker device by virtue of physical interconnection, wherein the second connector part in the audio communication system operating mode is configured to interconnect with an external device, providing wireless communication between the speaker device and the external device.

2. An audio communication system according to claim 1, wherein the dongle comprises a USB type interface and wherein the control functionality is implemented as a human interface device protocol.

3. An audio communication system according to claim 2, wherein the speaker device is configured to initiate pairing between the dongle and the speaker device.

4. An audio communication system according to claim 3, wherein the speaker device is configured to automatically pair the speaker device and the dongle upon connection of the first connector part with the second connector part.

5. An audio communication system according to claim 1, wherein the speaker device comprises a user interface, the user interface having an initiating button enabling a user to initiate pairing between the speaker device and the dongle when the first connector part and the second connector part are interconnected.

6. An audio communication system according to claim 5, wherein the first and the second wireless communication units are Bluetooth communication units.

7. An audio communication system according to claim 6, wherein a charging cable is configured to charge the speaker device via the first connector part.

8. An audio communication system according to claim 7, wherein the second connector part is configured to physically connect to the first connector part of the speaker device and to physically connect to a third connector part of an external device.

9. An audio communication system according to claim 8, wherein the first connector part and the second connector part form a pair of mating connectors.

10. An audio communication system according to claim 9, wherein the first connector part is a first receptacle connector part, the second connector part is a protruding connector part, and wherein the receptacle connector part is configured to receive the protruding connector part.

11. An audio communication system according to claim 8, wherein the third connector part is a second receptacle connector part, the second connector part is a protruding connector part, and wherein the second receptacle connector part is configured to receive the protruding connector part.

12. An audio communication system according to claim 11, wherein the dongle has one connector part, the one connector part being the second connector part.

13. An audio communication system according to claim 12, wherein the audio communication system is configured to provide a notification when the pairing has succeeded.

14. An audio communication system according to claim 13, wherein the speaker device is configured to provide a first notification before being paired; the dongle is configured to provide a second notification before being paired, and wherein the speaker device is configured to provide a third notification and the dongle is configured to provide a fourth notification after pairing has succeeded; the third notification and the fourth notification having at least one notification parameter in common.

15. A method of operating an audio communication system, wherein the audio communication system comprises a speaker device having at least one speaker, a two part dongle constructed to have physically interconnetable first and second parts, which have a first wireless communication unit and a first connector part, and having call control functionality, a second wireless communication unit, and a second connector part wherein the method comprises in a first mode being an audio communication system pairing mode:

physically connecting the second connector part with the first connector part, and enabling pairing of the dongle and the speaker device;

in a second mode being an audio communication system operating mode:

connecting the second connector part with an external device, and providing wireless communication between the speaker device and the external device.

* * * * *